United States Patent

Kerr et al.

[11] Patent Number: 6,058,566
[45] Date of Patent: May 9, 2000

[54] BREAKAWAY COMPOSITE HINGE STRUCTURE

[75] Inventors: Ronald W. Kerr, Geneva; Kevin B. Tews, St. Charles, both of Ill.

[73] Assignee: Miner Enterprises, Inc., Del.

[21] Appl. No.: 09/129,967

[22] Filed: Aug. 6, 1998

[51] Int. Cl.[7] .................................................. A47C 7/62
[52] U.S. Cl. ..................... 16/387; 16/222; 16/DIG. 13; 49/381
[58] Field of Search .............................. 16/387, 222, 225, 16/DIG. 13, 382; 296/189, 146.11, 146.1, 181; 49/381; 403/2

[56] References Cited

U.S. PATENT DOCUMENTS

| | | |
|---|---|---|
| D. 35,238 | 10/1901 | Tower ........................................ 16/387 |
| 1,097,458 | 5/1914 | McKinney ................................ 16/387 |
| 3,475,783 | 11/1969 | Jorgensen . |
| 3,574,452 | 4/1971 | McLendon et al. . |
| 3,703,742 | 11/1972 | Konishi . |
| 4,175,315 | 11/1979 | Hayes et al. . |
| 4,545,090 | 10/1985 | redmond . |
| 4,553,286 | 11/1985 | Schwarz, II . |
| 4,875,251 | 10/1989 | Hazzard . |
| 5,072,488 | 12/1991 | Wlayard . |
| 5,104,187 | 4/1992 | Fischer et al. . |
| 5,122,007 | 6/1992 | Smith ........................................... 403/2 |
| 5,195,214 | 3/1993 | Lautenschlager et al. ................ 16/382 |
| 5,940,934 | 8/1999 | Turner .......................................... 16/275 |
| 5,988,927 | 11/1999 | Pfarr ............................................. 403/2 |
| 6,012,763 | 1/2000 | Clemente et al. ........................ 296/181 |

*Primary Examiner*—Anthony Knight
*Assistant Examiner*—Mark Williams
*Attorney, Agent, or Firm*—J. W. Harbst

[57] ABSTRACT

A hinge structure for interconnecting a swing door to a trailer body or the like and which allows the door to breakaway form the trailer body when an excessive shear force is applied to the hinge indicative of the door impacting against a surface or improperly engaging an adjacent trailer body.

26 Claims, 2 Drawing Sheets

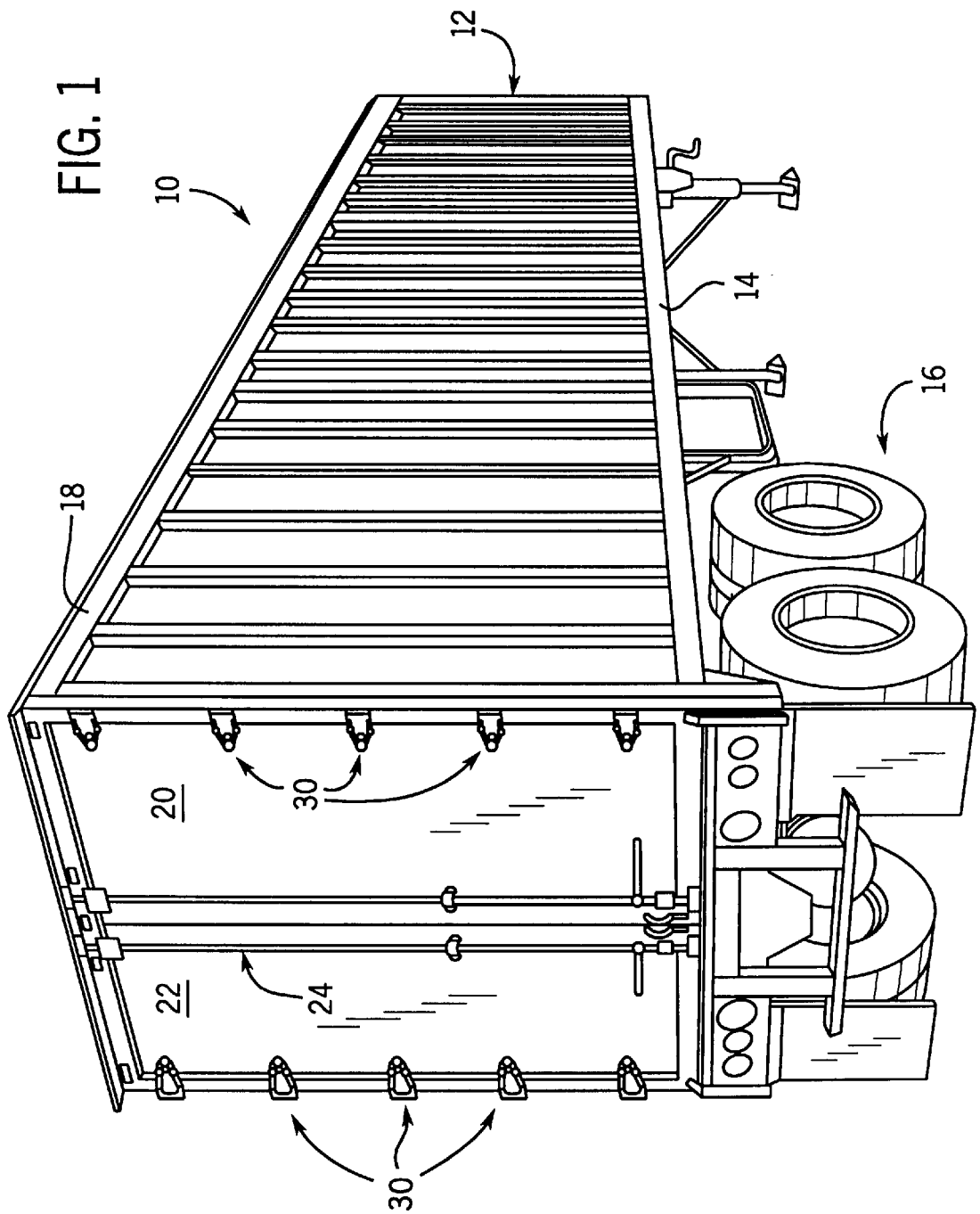

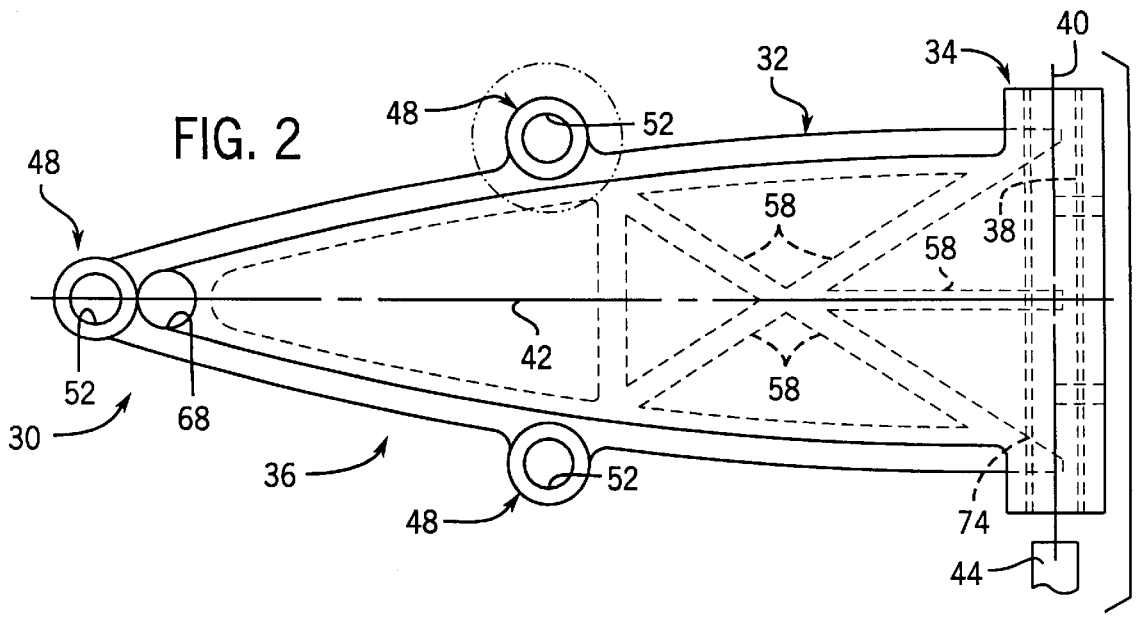
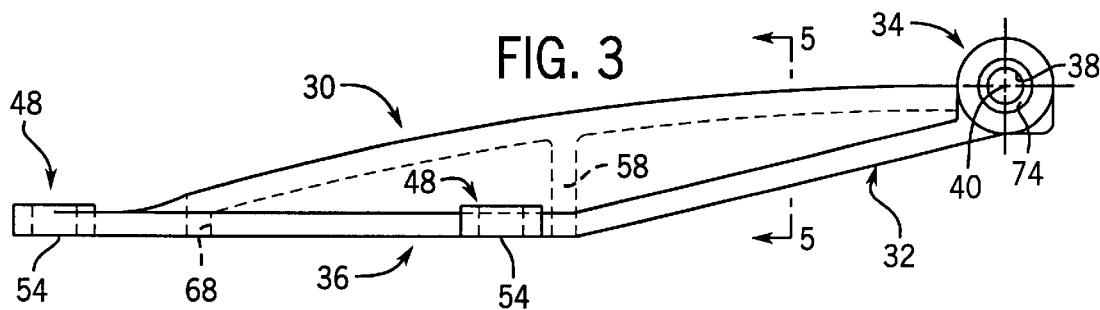
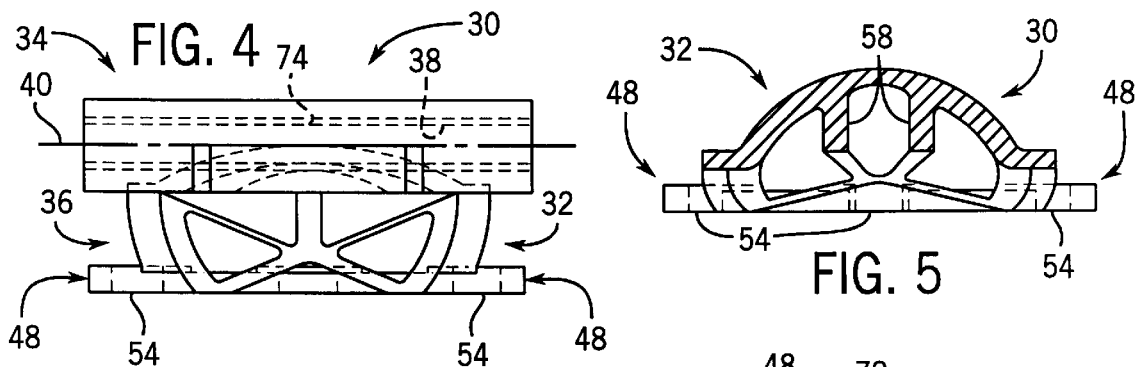
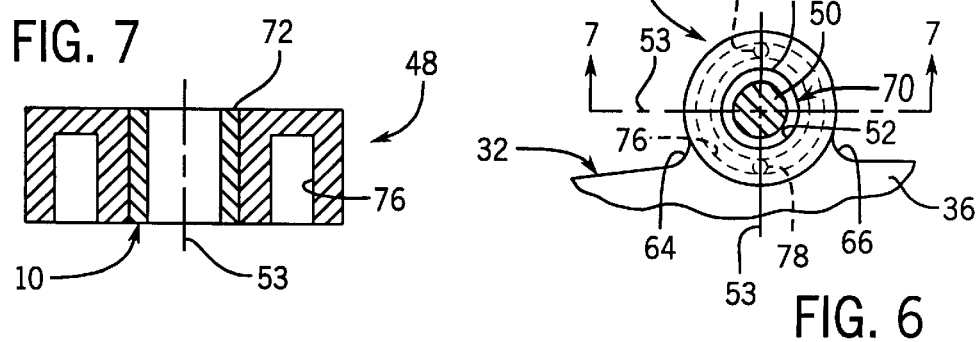
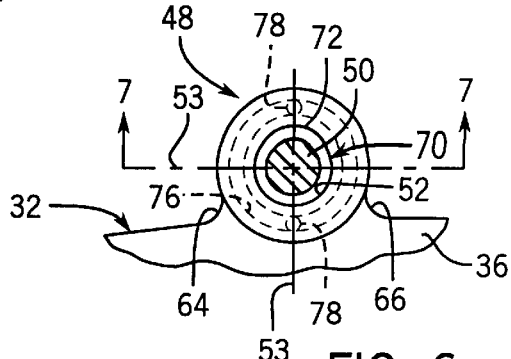

6,058,566

BREAKAWAY COMPOSITE HINGE STRUCTURE

FIELD OF THE INVENTION

The present invention generally relates to hinge structures and, more particularly, to a composite hinge structure for pivotally connecting a door to a rear open end of a trailer body and which allows the door to breakaway from the trailer body when a shear force of a predetermined magnitude is applied against the hinge thereby limiting the extent of damage to either the trailer body or the door.

BACKGROUND OF THE INVENTION

Trailer bodies are typically provided with a pair of side-by-side swing doors for closing an open rear end of the trailer body. Each swing door is pivotally interconnected to the trailer body by a plurality of vertically spaced hinges which are typically made of metal. Each hinge is configured to permit the swing door to move through an arc of about 270°. The door to which the hinge is connected is typically formed from wood with a steel or aluminum sheeting on the inner and outer sides thereof.

As is well known, a series of fasteners, i.e., threaded bolts and nuts, are used to secure each hinge to a swing door. Because they are secured outside of the trailer body and door, the metal hinges are exposed to all environmental conditions such as rain, sleet, snow as well as road salts, greases and oils. As will be appreciated, a metallic hinge performs poorly in the early stages of corrosion and can become completely inoperable if the corrosion is not stopped. To reduce the likelihood of corrosion, a Mylar backing is usually positioned between each hinge and the door.

After arriving at a delivery site, it is common to swing open each of the doors, at the rear of the trailer body, from their closed position through an arc of about 270° and secure them to the sides of the trailer body. Thereafter, the trailer body is driven rearwardly and positioned relative to an unloading area which, typically, includes a raised dock.

Occasionally, the doors are not properly secured to the sides of the truck or trailer body and, as the trailer body is moved rearwardly, the doors tend to swing away from the side of the trailer body toward a partially closed position. Unfortunately, the driver does not always realize, or is not always alerted to, the door at the rear of the trailer body becoming unfastened from the side. Eventually, and as a result of the continued rearward movement of the trailer body, the partially closed door is jammed against the dock which can result in significant damages to the door and/or the trailer body.

Even when the doors remain fastened to the side of the trailer body, space constraints in some dock areas is extremely limited. Accordingly, and as the trailer body is being moved rearwardly into position relative to the dock, it is not uncommon for the door to engage or snag an adjacent trailer body. Here again, excessive forces are applied in a longitudinal direction to the hinges connecting the doors to the trailer body. As mentioned above, such excessive shear forces can result in significant damage to either or both the trailer bodies. That is, the trailer body and/or the swing door on one or both of the trailers can be damaged.

As mentioned above, swing doors for closing the rear open end of trailer bodies and the like are typically connected to the trailer body with a plurality of vertically spaced hinges. Thus, when the door is jammed against a dock or adjacent trailer body, the resulting damage to the door usually requires repair and/or replacement of more than one of the hinges. This is a time consuming repair operation usually involving extensive manual efforts, thus, resulting in costly repairs. Of course, during the repair, the trailer body is removed from service, thus, adding to the overall costs involved in effecting door repair and/or replacement.

Thus, there is a need and desire for a hinge structure which will connect the swing door to a trailer body or the like in a manner permitting movement of the swing doors through an arc of about 270° while conjointly inhibiting damage to the door and trailer body when shear forces exceeding a predetermined magnitude are applied to the hinge.

SUMMARY OF THE INVENTION

In view of the above, and in accordance with the present invention there is provided a hinge structure for interconnecting a swing door to a trailer body or the like and which allows the door to breakaway form the trailer body when an excessive shear force is applied to the hinge indicative of the door impacting against a surface or improperly engaging an adjacent trailer body. Preferably, the breakaway hinge of the present invention includes a one-piece composite body having a series of mounting areas whereat the hinge is connected to the door. Each mounting area on the hinge is configured to withstand normal loads imparted thereto by the door while allowing for fracture of the hinge and thereby separation of the door from the trailer body in response to a shear loading of a predetermined magnitude being placed upon the hinge.

In a preferred form, the hinge of the present invention is configured to permit angular movement of the swing door through an arc of about 270°. The composite body of the hinge includes a hinge portion and a mounting portion arranged in offset relation relative to each other to permit the door to which it is attached to move through the 270° path of arcuate movement. The hinge portion is configured to accommodate a pivot pin used to pivotally interconnect the hinge to the trailer body. The mounting portion of the hinge comprises a series of axially spaced mounts preferably disposed to opposite vertical sides of the longitudinal axis of the elongated body forming the hinge. Each mount is configured to allow an attachment member or fastener, used to connect the hinge to the door, to pass through the composite body.

Notably, each mount is designed to withstand the normal loads placed thereon by the door while allowing the hinge and door to breakaway from each other in response to a shear force in excess of a predetermined magnitude being placed on the hinge. In the illustrated form of the invention, each mount is provided with a zone of weakening for allowing fracture of the hinge in response to a shear loading of a predetermined magnitude being applied to the hinge. In one form, the zone of weakening is defined by a pair of reliefs designed in the mount. The reliefs associated with each mount are small enough to create stress concentration but are sized to overcome normal stresses imparted to the hinge. Alternatively, the zone of weakening is defined by an opening or relief disposed longitudinally adjacent the opening in the apertured mounting.

The flanges on the mounting portion of the hinge body combine with each other to define a generally planar mounting surface which abuts and fits flush against the surface of the swing door to which the hinge is attached. In a preferred form of the invention, the mounting portion of the elongated body is configured with a raised profile extending outwardly away from the planar mounting surface defined by the mounting flanges. In a most preferred form of the invention, the raised profile has an arcuate shape to add strength and rigidity to the hinge.

Over time, composite materials tend to creep when subjected to continuous and relatively high levels of pressure. In this regard, metal sleeves are preferably arranged in combination with the mounts associated with the hinge. Because the hinges are typically fastened to the door using fasteners such as bolts, nuts and washers, providing an insert in combination with each mount will advantageously allow the fastener to maintain a substantially constant clamping force between the hinge and the swing door. Moreover, in a preferred form, the elongated opening in the hinge portion of the elongated hinge body or member is also provided with an insert which journals the pivot pin used to pivotally secure the swing door to the trailer body.

One of the advantages to be realized in using a composite material to form the hinge involves the additives which can be used to customize the composite material used to form the hinge body as a function of the particular application and hinge design. In a preferred form, the composite material used to form the hinge is selected from a class of glass filled nylon and/or plastic materials. Moreover, the composite material used to form the hinge can include reflective materials as part thereof, thus, enhancing the visibility of the hinges on the trailer doors. Alternatively, the composite body forming the hinge can be treated with a coating of reflective material to promote the visibility of the hinge in the dark. In still another form, the materials used to form the hinge body can be colored to provide the hinge with a desired pigmentation.

A primary object of the present invention relates to the provision of a breakaway hinge which allows a swing door on a trailer body to be moved through an arc of about 270° and which allows the door to separate from the trailer body when an excessive shear force is applied to the hinge indicative of the door impacting against a surface or inadvertently engaging an adjacent trailer body. In addition to those advantages described above, the hinge of the present invention allows more efficient use of materials. That is, the composite hinge of the present invention is lighter in weight than conventional metal hinges of comparable design. Of course, the consumer pays the high cost of transportation of heavier metal hinges. Moreover, and while retaining exacting consistency between parts, the composite hinge of the present invention is more economical to manufacture than comparable metal hinges. The composite structure of the present invention allows this hinge to better withstand the elements and the environment in which it finds utility. Furthermore, and because it is made from corrosive resistant materials, the hinge of the present invention avoids the need for Mylar inserts between the hinge and the door, thus, simplifying the assembly process.

These and other additional objects, aims and advantages of the present invention will be appreciated from the following detailed description, the drawings and the appended claims.

DETAILED DESCRIPTION OF THE DRAWINGS

FIG. 1 is a rear perspective view of a trailer body having swing doors connected to an open rear end thereof with hinges according to the present invention;

FIG. 2 is a top plan view of a hinge embodying principles of the present invention;

FIG. 3 is a side elevational view of the hinge illustrated in FIG. 2;

FIG. 4 is an end view of the hinge illustrated in FIG. 2;

FIG. 5 is a sectional view taken along line 5—5 of FIG. 3;

FIG. 6 is an enlarged view of the area encircled in phantom lines FIG. 2; and

FIG. 7 is an enlarged sectional view taken along line 7—7 of FIG. 6.

DETAILED DESCRIPTION OF THE PRESENT INVENTION

While the present invention is susceptible of embodiment in several various forms, there is shown in the drawings and will hereinafter be described in detail a preferred embodiment of the invention with the understanding the present disclosure is to be considered as setting forth an exemplification of the invention which is not intended to limit the invention to the specific embodiment illustrated.

Referring now to the drawings, wherein like reference numerals indicate like parts throughout the several views, in FIG. 1 a schematic illustration of a substantially conventional trailer, generally indicated by reference numeral 10, is shown. In the exemplified embodiment, the trailer 10 includes an elongated trailer enclosure or body 12 having a rectangularly walled configuration including a floor (not shown). As well known in the art, the trailer body 12 includes a rigid frame 14 supported for movement over the ground by one or more pairs of ground engaging wheels 16.

As is conventional, the trailer body 12 defines an open rear end 18 for allowing transportable commodities to be loaded into the walled enclosure or body 12. In the illustrated trailer body 12, the open rear end 18 is closed by a pair of substantially identical swing doors 20, 22. Each swing door 20, 22 is preferably fabricated with a wood core (not shown) and conventional metal sheeting extending over the exterior and interior surfaces thereof. Suitable hardware 24 is provided on the doors 20, 22 and trailer body 12 to releasably lock the doors 20, 22 in a closed position. Toward an outer vertical edge thereof, each door 20, 22 is provided with a plurality or series of virtually identical vertically spaced hinges or hinge structures 30.

The hinges 30 serve to interconnect each door 20, 22 to the trailer body while allowing each door 20, 22 to swing through an arc of about 270°. After the doors 20, 22 are swung through an arc of about 270° from the position illustrated in FIG. 1, each door 20, 22 will extend generally parallel to and along side a respective outer side wall of the trailer body 12. The trailer body 12 is provided with conventional hardware (not shown) for latching the doors 20, 22 to the side of the trailer body 12.

FIGS. 2 through 5 illustrate, in more detail, specifics of the hinge structure 30. As shown, hinge structure 30 includes a longitudinally elongated one piece composite body 32 having a hinge portion 34 and a mounting portion 36. The hinge body 32 is preferably formed from a plastic material known as glass filled nylon. In the illustrated embodiment, the hinge body 32 is formed of about thirty percent (30%) glass filled nylon which can be cast or molded using conventional techniques at relatively low cost. The glass filled nylon employed should be virgin materials. One type of composite material which appears to perform well is that sold under the trade name Nylon 6/6. It should be appreciated, however, other composite materials may equally suffice without detracting or departing from the true spirit and novel concept of the present invention.

In the exemplary embodiment illustrated, the hinge portion 34 includes an elongated opening 38 defining an elongated axis 40 disposed generally perpendicular or normal to an elongated axis 42 (FIG. 2) defined by the mounting portion 36 of body 32. The opening 38 in the hinge portion 34 of body 32 is adapted to slidably accommodate a pivot pin 44 used to pivotally interconnect the hinge structure 30 to the trailer body 12 (FIG. 1).

The mounting portion 36 on the elongated hinge body 32 includes a series of outwardly extending flanges or mounts 48. Each mount or flange 48 is configured to allow a suitable attachment member or fastener 50 (FIG. 6), such as a threaded bolt or the like, to pass therethrough thereby securing the hinge body 32 to the door 20, 22 (FIG. 1) of the trailer body 12. In the exemplary form of the invention illustrated in FIG. 2, each mount or flange 48 defines an aperture or throughhole 52 for encircling and entrapping a lengthwise portion the fastener 50 passing therethrough. In the illustrated form, the aperture or throughhole 52 has a closed margin extending thereabout. The aperture or throughhole 52 is preferably centralized on the respective mount or flange 48 and defines a centerline 53 (FIG. 6).

In the illustrated form of the invention, the hinge body 32 is provided with three mounts 48. As shown, two of the mounts 48 are disposed to opposite sides of the longitudinal axis or centerline 42 of the mounting portion 36 of hinge body 32 with the third mount 48 being centrally disposed toward a terminal end of the elongated body 32 opposite from the hinge portion 34. It should be appreciated, however, the mounting portion 36 of the hinge body 32 could be provided with more flanges 48 than that shown without detracting or departing from the spirit and scope of the present invention.

Each mount or flange 48 on the mounting portion 36 of the hinge structure 30 defines a generally flat mounting surface 54 adapted to be arranged in confronting and abutting relationship relative to a door 20, 22 when the hinge structure 30 is secured to the door 20, 22. As shown in FIGS. 3, 4 and 5, the mounting surfaces 54 of the various mounts or flanges 48 on the mounting portion 36 of each hinge 30 are arranged in generally planar relationship relative to each other. Notably, in the illustrated form shown in FIGS. 3 and 4, the elongated opening 38 defined by the hinge portion 34 of the hinge body 32 for accommodating the hinge or pivot pin 44 (FIG. 1) is arranged in spaced relation relative to the planar mounting surfaces 54 of the mounts 50 on the mounting portion 36 of the hinge body 32.

As shown in FIGS. 4 and 5, one of the many salient features of the present invention relates to the mounting portion 36 of the hinge body 32 having a raised profile extending the length thereof and disposed between the mounting flanges 48. In a most preferred form of the invention, the raised profile of the mounting portion 36 has a generally curvilinear or convex profile to add strength and rigidity to the mounting portion 36.

As shown in FIGS. 2, 3, 4 and 5, the mounting portion 36 of the composite hinge body 32 further includes a series of supports 58 arranged in depending relation to the raised profile of the mounting portion 36 of the hinge body 32 to add further strength and rigidity to each hinge structure 30. In a most preferred form of the invention, and as shown in FIGS. 2 and 3, the supports 58 on the mounting portion 36 of the composite hinge body 32 includes gussets or braces and a longitudinally elongated web. It will be appreciated, however, other designs and forms of supports can be used in combination with the mounting portion 36 of the hinge body 32 without detracting or departing from the spirit and scope of the present invention.

Another of the salient features of the present invention relates to the ability of each hinge structure to fracture when the hinge structure 30 is subjected to excessive shear loading indicative of the door 20, 22 impacting against a surface or inadvertently engaging an adjacent trailer body, thus, allowing a respective door 20, 22 to separate from the trailer body 12. The ability of the present invention to accomplish this result is advantageously achieved by providing each mount or flange 48 on the mounting portion 36 of the composite hinge body 32 with a zone of weakening specifically configured to permit the hinge 30 to fracture upon an excessive shear load or force being directed against the hinge structure 30.

The terms "excessive shear load or force" or "excessive shear loading" or "shear loading of a predetermined magnitude" or "shear loading of a predetermined value" as used herein do not have a specific numerical value associated therewith. As will, be appreciated, the amount of force or shear load which will ultimately cause fracture of the hinge body 32 can vary considerably depending upon a number of factors including—but not limited to—the size of the fasteners used to secure the hinge to the door, the number of fasteners used to secure the hinge to the door, the type of fasteners used to secure the hinge to the door, the composition of the door, the composite material used to form the hinge body 32 to name just a few for exemplary purposes. Accordingly, the terms "excessive shear load or force" or "excessive shear loading" or "shear loading of a predetermined magnitude" or "shear loading of a predetermined value" as used herein are intended to be interpreted as that force or load which, when applied to a door on a trailer body and in a longitudinal direction relative to the hinge 30, will normally result in damage to either the door or the trailer body.

In one form, and as shown in FIG. 6, the zone of weakening is defined on the elongated hinge body 32 by a pair of reliefs 64, 66 arranged in longitudinal relation relative to each other on each mount or flange 48 of the mounting portion 36 of the composite hinge body 32. Notably, the reliefs 64, 66 are sized to create a stress concentration in a specific area of the mount or flange 48 but yet are sized to overcome normal stress imparted to the mount or flange 48 during normal operation of the hinge structure 30. That is, the reliefs 64, 66 are specifically designed to permit fracture of the hinge structure 30 whey a shear force of a predetermined magnitude is directed against the hinge structure 30 without effecting performance of the hinge structure 30 under other loading conditions. As shown, the reliefs 64, 66 are disposed to opposite longitudinal sides of the centerline 53 of the mount or flange 48 and are disposed between the centerline of the respective flange 48 and the adjacent side or edge of the mounting portion 36 of the hinge body 32. The disposition of the reliefs 64, 66 on opposite longitudinal sides of the flange 48 permits the hinge body 32 to fracture when excessive shear forces are imparted in ether longitudinal direction against the door 20, 22 (FIG. 1).

In an alternative form, and as shown in FIG. 2, the zone of weakening in the composite hinge body 32 is defined by a throughhole or aperture 68 in the mounting portion 36 of the hinge body 32 longitudinally adjacent the centrally disposed mount or flange 48 at the terminal end of the mounting portion 36 of the hinge body 32. Notably, and to allow fracture of the mounting portion 36 of the hinge body 32, the throughhole or aperture 68 is sized relative to the diameter of the hole or aperture 52 in the respective mount or flange 48 to allow the fastener passing through the aperture 52 to breakthrough that section or piece of the mounting portion 36 of the hinge body 32 disposed between the adjacent apertures 52 and 68 thereby allowing the door 20, 22 to separate from the trailer body 12. Notably, the recess or opening 68 in the mounting portion 36 of the composite hinge body 32 is longitudinally disposed relative to the aperture or throughhole 52 in the adjacent flange 48 to permit fracture of the hinge structure 30 when shear forces of a predetermined magnitude are directed against the hinge structure without effecting performance of the hinge structure 30 under other loading conditions. As will be appreciated, the walled structure of the flange 48 in the area diametrically opposed to the recess or opening 68 likewise permits fracture of the hinge structure 30 and, thus, separation of the door from the trailer body when shear forces of a predetermined magnitude are directed in an opposite longitudinal direction against the hinge structure 30 without effecting performance of the hinge structure 30 under other loading conditions.

While offering numerous advantages over other heretofore known materials, composite materials, such as glass filled nylon plastic composites, tend to creep over time when subjected to continuous and relatively high levels of compression or pressure. As will be appreciated by those skilled in the art, a relatively high level of compression or torque is normally applied to the fasteners 50 passing though the hinge when it is secured to the door 20, 22. To maintain a relative even or constant degree or level of compression on the hinge structure once it is secured to the door 20, 22, each mount 48 of the mounting portion 36 of the composite hinge body 32 preferably further includes an insert 70 (FIG. 6) accommodated within the aperture or throughhole 52 defined by each mount 48. Insert 70 is preferably formed as a metal cylindrical sleeve 72 sized to allow the fastener 50 to pass therethrough and has length equal to the thickness of the mount 48 in the area of the throughhole or aperture 52. As will be appreciated, the purpose of the insert 70 is to limit the compressive force applied to the composite body 32 as through the fastener 50 while maintaining an adequate holding force of the hinge structure 30 to the door 20, 22.

A preferred embodiment of the invention furthermore includes one or more inserts 74 fixedly arranged in the elongated opening 38 on the hinge portion 34 of the composite hinge body 32. The insert 74 is preferably sized to slidably receive and journal the pivot pin 44 used to connect the hinge structure 30 to the trailer body 12. As will be appreciated, the insert 74 can be formed from any suitable material and preferably from metal to promote the endurance of the hinge structure 30 as it pivots about the axis of the pivot pin 44.

In the exemplary form of the hinge body illustrated in FIG. 7, each flange 48 on the mounting portion 36 is configured with a cored recess or channel 76 arranged in generally concentric relationship relative to the centerline 53 of the hole or aperture 52 and with diametrically opposed connecting members 78. As will be appreciated by those skilled in the art, the cored channel or recess 76 enhances manufacturability of the composite hinge body 32 by maintaining the section thicknesses in and about the mounts 48 generally uniform and as thin as possible thereby enhancing cooling of the flange 48 during fabrication of the hinge body 32.

Forming the hinge body 32 as a composite structure offers several benefits. First, forming the hinge body 32 from a composite material beneficially allows orientation of the glass filled reinforcing fibers to obtain maximum strength and rigidity for the hinge structure 30. Second, forming the hinge body 32 as a composite structure is lighter in weight than comparable metal hinges. Moreover, the composite plastic hinge body is more resistant to environmental conditions than equivalent metal hinges. Also, the composite structure of the hinge body 32 offers a more economical use of materials in that a composite hinge is less expensive to manufacture than a comparable metal hinge. Additionally, and since the composite body is not subject to corrosion, there is no need for a separate Mylar insert between the hinge structure and the trailer door. Accordingly, the composite hinge of the present invention simplifies the assembly of the hinge structure 30 to the door 20, 22 of the trailer body 12. As will be appreciated by those skilled in the art, forming the hinge body 32 from a composite plastic material allows color variations to be easily and readily added to the hinge structure 30 thereby providing an appearance which colorfully corresponds and/or compliments the exterior color of the trailer body 12.

In addition, reflective materials, i.e., glass particles and the like, can readily and easily be added to the materials forming the composite body 32 of the hinge structure 30, thus, promoting the reflective ability and thereby the conspicuousness of the hinge structure 30 in darker conditions. Alternatively, a reflective coating can be readily and easily applied to the hinge body 32 to enhance its reflective capabilities and, thus, promote the conspicuousness of the hinge structure 30 when lights are shown thereupon.

In operation, the hinge structures 30 used to interconnect the doors 20, 22 to the trailer body 12 not only effectively allow each door 20, 22 to move through a 270° path of movement to allow them to be moved from a closed position (FIG. 1) to a position whereat they are secured to the sides of the trailer body 12 but the hinges 30 furthermore serve to protect against inadvertent damage to the doors 20, 22 and the trailer body 12. As discussed above, when a shear force is applied to the hinge structure 30 in excess of a predetermined value or magnitude, indicative of a respective door 20, 22 impacting against a dock or inadvertently snagging an adjacent trailer body, the zone of weakening associated with the mounts 48 on the mounting portion 36 of the hinge body 32 will permit fracture of the hinge body 32 thereby permitting separation of the door 20, 22 from the trailer body 12 before serious damage can result to either the trailer body 12 or the doors 20, 22. One of the salient features of the present invention being that the zone of weakening associated with the mounts 48 of the mounting portion 36 of the composite hinge body 32 creates stress concentration areas on the hinge body 32 which allow fracture of the hinge structure 30 under shear loading conditions without effecting overall hinge performance under normal loading and operating conditions.

From the forgoing it will be observed that numerous modifications and variations can be effected without departing or detracting from the true spirit and the novel concept of the present invention. It will be appreciated that the present disclosure is intended to set forth exemplifications of the invention which are not intended to limit the invention to the specific embodiments illustrated. The disclosure is intended to cover by the appended claims all such modifications and variations as fall within the spirit and scope of the claims.

What is claimed is:

1. A hinge for connecting a door to a trailer body in a manner permitting pivotal movement of the door about a generally vertical axis, said hinge comprising:

a longitudinally elongated hinge body formed from composite material and having a mounting portion and a hinge portion arranged in longitudinal relation relative to each other, said hinge portion defining an elongated opening for accommodating a pivot pin used to pivotally interconnect the hinge to the trailer body, and wherein said mounting portion comprises a series of mounts for allowing attachment members, used to connect the hinge to the door, to pass therethrough, with each mount being configured with a zone of weakening allowing said hinge and door to breakaway from each other in response to a shear force of predetermined magnitude being applied to said hinge.

2. The hinge according to claim 1 wherein the mounting portion of said hinge body defines a mounting surface, and wherein the elongated opening defined by said hinge portion of the elongated member is arranged in spaced relation relative to a mounting surface defined by said series of mounts to allow the door connected to said hinge to swing through an arc of about 270°.

3. The hinge according to claim 1 wherein the mounting portion of said hinge body has a raised profile disposed between opposed mounts to add strength and rigidity to said hinge.

4. The hinge according to claim 1 wherein the mounting portion of the hinge body defines a series of supports to add strength and rigidity to the hinge.

5. The hinge according to claim 1 wherein the mounting portion of the hinge body includes at least three mounts, with two of said mounts being disposed to opposite sides of a longitudinal centerline of the hinge body and the other mount being centrally disposed toward a terminal end of the elongated hinge body opposite from the hinge portion.

6. The hinge according to claim 1 wherein the zone of weakening is defined by reliefs provided on the elongated member on opposite longitudinal sides of a centerline defined by each mount.

7. The hinge according to claim 1 wherein each mount of said mounting portion of the hinge body includes an aperture having a closed margin extending thereabout.

8. The hinge according to claim 7 wherein the zone of weakening is defined by an opening disposed adjacent to said aperture in said mount in a longitudinal direction between said apertured mount and the hinge portion of said hinge body.

9. The hinge according to claim 1 wherein the composite material from which said hinge body is formed has a reflective quality.

10. The hinge according to claim 1 wherein said hinge body is treated with a material capable of promoting visibility of the hinge in the dark.

11. The hinge according to claim 1 further including an insert accommodated within each mount for limiting compression of the mount when said attachment member secures said hinge to the door.

12. The hinge according to claim 1 further including an insert accommodated within said elongated opening of the hinge portion of said hinge body.

13. A breakaway hinge for connecting a door to a trailer body in a manner allowing the door to separate from the trailer body when the door is subjected to a predetermined overloading thereof which would cause damage to either the door or trailer body, wherein said hinge includes a one-piece composite body having a series of mounting areas whereat the hinge is connected to the door, with each mounting area being configured to allow for fracture of the hinge and thereby separation of the door from the trailer body in response to a shear loading of a predetermined magnitude being placed upon the hinge.

14. The hinge according to claim 13 wherein the composite body of said hinge is longitudinally elongated and has said mounting areas connected thereto and disposed to opposite sides of a longitudinal centerline thereof.

15. The hinge according to claim 13 wherein some mounting areas on said composite body comprises a flange configured to allow a fastener to extend therethrough and which radially extends outwardly from said composite body.

16. The hinge according to claim 15 further including a metal insert captively received within said flange for limiting the compressive force a fastener can apply to the hinge.

17. The hinge according to claim 13 wherein said mounting areas are disposed in generally planar relationship relative to each other, and wherein said composite body has a raised configuration between said mounting areas for adding strength and rigidity to said hinge.

18. The hinge according to claim 13 wherein each mounting area provided on said composite body defines a zone of weakening for allowing fracture of the hinge in response to shear loading of a predetermined magnitude being placed on the hinge.

19. The hinge according to claim 13 wherein said composite body is formed from a glass reinforced plastic material.

20. The hinge according to claim 13 wherein the composite body includes reflective materials forming part thereof.

21. The hinge according to claim 13 wherein the composite body is treated with a coating of reflective material.

22. The hinge according to claim 13 wherein said composite body further includes a pivot portion arranged in spaced relation relative to the mounting areas whereat the hinge is connected to the door to permit said door to swing through an arc of about 270°.

23. The hinge according to claim 22 further including an insert arranged in combination with the pivot portion of said composite body for journalling a pivot pin used to interconnect the hinge to the trailer body.

24. A lightweight plastic hinge for connecting a door to an open rear end of a trailer body for pivotal movement about a vertical axis, said hinge comprising:

a one-piece longitudinally elongated hinge body having a mounting portion and a hinge portion, said hinge portion defining an opening for accommodating a pivot pin used to connect the door to the trailer body and which defines the vertical axis about which said door moves, and wherein the mounting portion of said hinge comprises a mounting surface adapted to abut flush against the door to which the hinge is connected and a raised body portion extending outwardly away from said mounting surface, with the mounting portion of said hinge further includes a series of mounting flanges extending in opposite vertical direction relative to each other outwardly from said body portion, and wherein each mounting flange defines a zone of weakening longitudinally disposed between a respective flange and the body portion of the hinge allowing for fracture of the hinge when a longitudinal force of predetermined magnitude is applied to the door thereby allowing the door to separate from the trailer body before substantial damage is caused to either the door or the trailer body.

25. The hinge according to claim 24 wherein the raised body portion of said hinge body has a curvilinear configuration between opposed flanges for adding strength and rigidity to said hinge.

26. The hinge according to claim 24 wherein said elongated hinge body has a reflective quality to enhance visibility thereof in the dark.

* * * * *